C. E. GRAY.
Apparatus for Rendering Lard, Tallow, &c.
No. 46,103. Patented Jan'y 31, 1865.
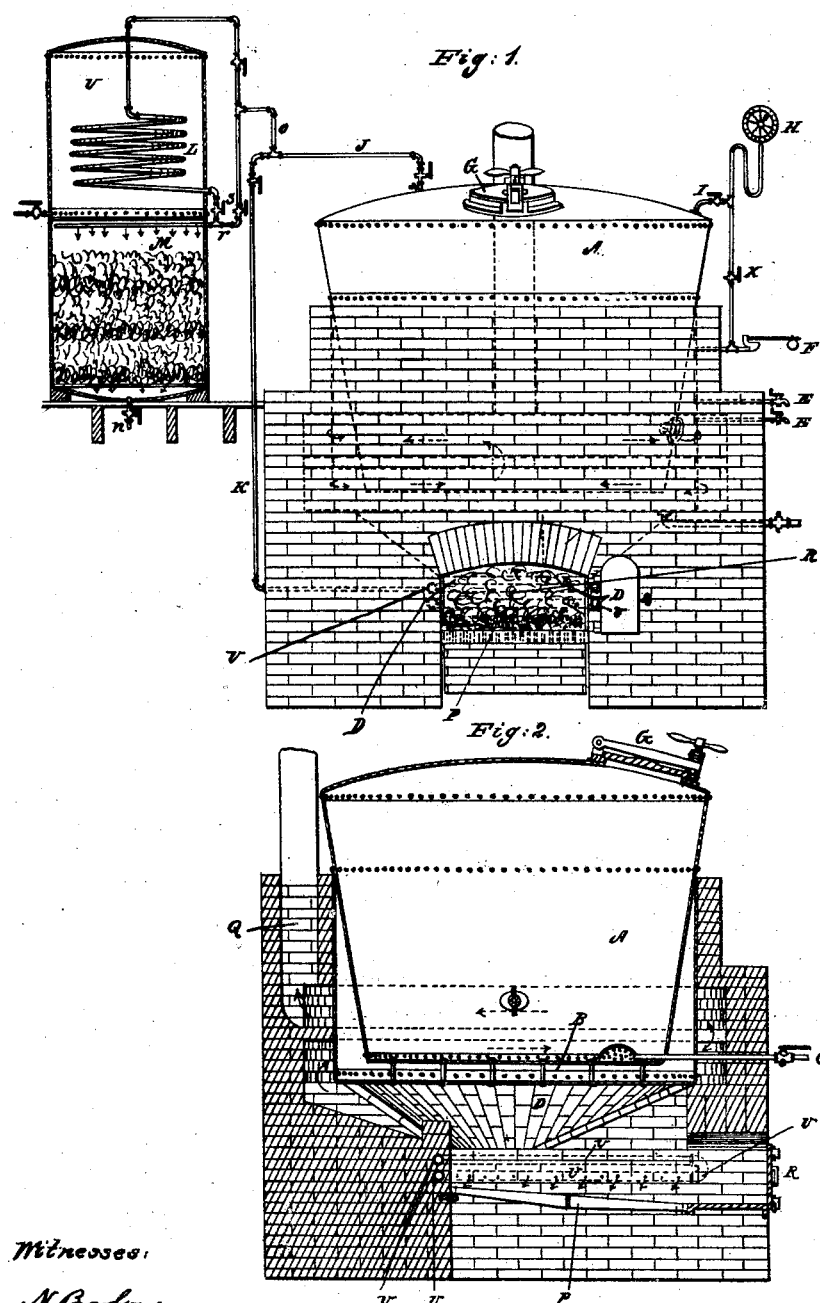

UNITED STATES PATENT OFFICE.

C. E. GRAY, OF NEW YORK, N. Y.

IMPROVEMENT IN APPARATUS FOR RENDERING LARD, TALLOW, &c.

Specification forming part of Letters Patent No. 46,103, dated January 31, 1865.

*To all whom it may concern:*

Be it known that I, CARROLL E. GRAY, of the city, county, and State of New York, have invented certain new and useful Improvements in Rendering Apparatus for Rendering Lard, Tallow, and other Similar Substances; and I do hereby declare the following to be a full, clear, and exact description of the same, reference being had to the annexed drawings, making part of this specification, in which—

Figure 1 is a front elevation of the apparatus and furnace, and Fig. 2 a vertical section through the same.

To enable others skilled in the arts to which my invention appertains to make and use the same, I will proceed to describe the object, nature, and extent thereof and the manner of making and operating the same.

There are four important considerations which should govern the construction and erection of a rendering apparatus. The first object should be to obtain the best quality of rendered fat; the second to obtain the largest possible yield; the third to reduce the fat without making the rendering-establishment a nuisance, and the fourth economy of fuel, time, and labor. To answer these conditions the apparatus should be made to render by the application of a dry heat and possess means of exactly regulating the temperature applied thereto. It should be made airtight, possess a large rendering or heating surface, be fitted with a properly-arranged pipe to provide for and control the escape of the noxious vapors and gases, to the end that they may be deodorized or consumed in the furnace, and should be so arranged in relation to the heating source that little or no heat will be wasted.

The old process of rendering was to put the fat in an open tank or kettle and apply the fire to the bottom, and continue to stir the fat until the rendering was completed. By this means a good quality of rendered fat was obtained, but the process is a tedious and laborious one, and is objectionable, on account of the noxious gases and vapors driven off in the atmosphere, which make it a nuisance, and also on account of its liability to scorch or burn the fat, there being no certain means of regulating the temperature.

Rendering by steam in tight and open tanks has also been extensively practiced, and so far as regards yield in the case of tight tanks with very good results, but the rendered fat is of inferior quality, it being mixed with more or less dirt, water, and gluten or gelatine. The water and steam in rendering dissolve the gluten, and mixes it with the fat and dirt, which unavoidably gets in the tank, making the fat soft, impure, and liable to spoil when stored; and, moreover, by the use of these tanks renderers do not avoid the nuisance with which their establishments are chargeable, for in blowing off steam and opening the tanks after rendering the stench is terrible, especially if the fat be a little sour before charging the tank, which frequently happens.

In the course of my practice, however, I have applied pipes to the tops of these tanks, to provide for the escape of the noxious vapors and gases to a deodorizing-chamber, or to the furnace for consumption, superheating the vapors and gases in the pipes before introducing them in the furnace. This practice has been attended with very good results.

The objections urged against tight steam-tanks are also applicable to open steam-tanks; but in the latter case the yield is not quite so large, nor is the fat quite so soft nor so liable to spoil. The temperature being lower, there is not so much gluten abstracted from the animal tissue. Rendering-tanks have also been made and used with a steam-jacket—that is, with a narrow chamber made around the outside of the tank to receive steam from a boiler provided to supply it, thus rendering by a dry surface heat in a close vessel; but these apparatuses are objectionable on account of the first cost, which is considerable, as a steam-boiler must always accompany the tanks, which adds very much to the cost of an establishment. Besides, the expense for fuel in such cases is large, owing to the loss of heat which unavoidably happens from radiation and condensation, which are incidental to the large surfaces exposed in such cases. And these tanks are also objectionable because they provide no means of disposing inoffensively of the vapor and gases set free in rendering. The water which is found in combination with the rough fat, amounting to about ten per cent. of the weight, is in these tanks liberated and kept in contact with the fat, so that all the injurious effects resulting from the presence of water may be urged against the use of these tanks with nearly as much force as in the case of close or open steam-tanks. To obtain first-rate results in tanks of this kind the vapor and gases should be conveyed away as fast as generated, or nearly so.

The object of the invention making the subject-matter of this application is to avoid the objections and supply the deficiencies above pointed out. The apparatus is shown in the drawings. It consists of a tight tank, A, fitted with a water and steam jacket, B, well braced to the tank to insure against explosion. The tank is provided with a pipe, $c$, for drawing off the rendered fat, and the jacket is provided with a pair of gage-cocks, E E, to ascertain the water-level, and said jacket is also fitted with a safety-valve, F, and a pressure-gage, H, which latter instrument also communicates with the tank by means of a branch pipe, I, by which the pressure in the tank may be ascertained as well as in the jacket by closing the cock X and opening the cock in said branch pipe. Said tank is also provided with a pipe, J, to carry the noxious gases and vapors from the tank either to the furnaces through the pipe K and the superheating-pipes $b\,b$, shown in dotted lines, Fig. 2,) around the furnace, or through the coil L in the condenser U, and from thence through the pipe $r$ to the deodorizing-chamber M, out of which the condense water escapes through the cock or pipe $n$. The connection between the pipe J and the coil-pipe is made by a branch pipe, $o$, the whole of the pipes being fitted with suitable cocks, to turn the vapor, gases, and water in the required direction either in the deodorizer, through the cock $s$ or in the condenser, as described.

This apparatus is set in brick-work, as shown in the drawings, directly over a furnace, D, from whence the draft-flues are carried to the chimney Q, up around the tank, as high as may be thought necessary to abstract the heat from the furnace. The furnace-front is shown by R, the grate-bars by P, and the gas-delivering and superheating-pipes in dotted lines by $v\,v$, the lower one of which is perforated to into the fire.

In operating the apparatus the tank is charged with rough fat and the jacket filled with water to just above the flues. The man-hole G is closed and the safety-valve is set to blow off at a pressure of about sixty pounds per square inch. Fire is then started in the furnace, and the rendering commences. The temperature can be ascertained and regulated either by the blowing-off of the safety-valve, or by the direct application of a thermometer to the jacket. The rough fat is rapidly and evenly rendered, the legitimate yield is as large as by any other process, and the rendered fat is of the best quality. The noxious gases are driven off through the pipe J either in the deodorizer or in the furnace by the pressure of steam generated in the tank from the water held in combination with the fat, and which is set free and evaporated during the process of rendering. This pressure thus generated in the tank from the constitutional water of the fat also serves to force the rendered fat out of the tank and deliver it in any part of the establishment.

It will be seen that this tank supplies the requirements of a first-rate rendering apparatus. It answers all the conditions—viz., a close tank, a dry heat, a ready means of regulating the temperature, a means of driving off, controlling, disinfecting, deodorizing, superheating consuming or condensing the gases and vapors as they escape from the tank, and a direct application of the steam and water jacket to the fire, thus avoiding loss of heat by condensation or radiation.

Having now described the object, nature, and extent of my invention, and the manner of making and using my apparatus, what I claim as new, and desire to secure by Letters Patent, is—

1. Making a close water-jacket in combination with the tank and a part of it, and arranging said water-jacket so made a part of said tank in direct communication with the furnace, so that the water-jacket shall intervene between the fire and the tank and act as a means of conducting and distributing the heat from the fire to and around the fat.

2. Using the steam generated in a close tank from the constitutional water in the fat for the purpose of aiding and controlling the escape of the noxious gases and vapors either to a superheater for consumption in the furnace, or to a deodorizer for the purpose of deodorizing them, or to a condenser for the purpose of condensing them, in the manner substantially as described, for the purpose specified.

C. E. GRAY.

Witnesses:
 ED. BARTLETT,
 N. BARLOW.